(12) United States Patent
Morel

(10) Patent No.: US 7,701,100 B2
(45) Date of Patent: Apr. 20, 2010

(54) SYNCHRONOUS MOTOR

(75) Inventor: Jean-Pierre Morel, Les Fourgs (FR)

(73) Assignee: Etel S.A., Môtiers (CH)

( * ) Notice: Subject to any disclaimer, the term of this patent is extended or adjusted under 35 U.S.C. 154(b) by 529 days.

(21) Appl. No.: 11/597,852

(22) PCT Filed: May 3, 2005

(86) PCT No.: PCT/EP2005/004767

§ 371 (c)(1),
(2), (4) Date: Nov. 28, 2006

(87) PCT Pub. No.: WO2005/119879

PCT Pub. Date: Dec. 15, 2005

(65) Prior Publication Data

US 2007/0222317 A1 Sep. 27, 2007

(30) Foreign Application Priority Data

Jun. 2, 2004 (DE) .................. 10 2004 027 036

(51) Int. Cl.
*H02K 1/27* (2006.01)

(52) U.S. Cl. .................... 310/156.19; 310/156.21; 310/216.116

(58) Field of Classification Search ........... 310/154.17, 310/154.19, 156.08, 156.19–156.22, 156.38–156.39, 310/216.116, 216.126; 29/596, 598
See application file for complete search history.

(56) References Cited

U.S. PATENT DOCUMENTS

| 4,625,392 A | | 12/1986 | Stokes |
| 4,636,107 A | | 1/1987 | Casler et al. |
| 4,954,736 A | * | 9/1990 | Kawamoto et al. ..... 310/156.21 |
| 5,216,306 A | | 6/1993 | Nakazawa et al. |
| 5,397,951 A | * | 3/1995 | Uchida et al. .......... 310/156.21 |
| 5,642,013 A | | 6/1997 | Wavre |
| 5,910,691 A | | 6/1999 | Wavre |
| 5,936,322 A | * | 8/1999 | Yamaguchi et al. ..... 310/156.19 |
| 5,962,942 A | | 10/1999 | Pullen et al. |
| 6,025,665 A | * | 2/2000 | Poag et al. ..................... 310/89 |
| 6,707,206 B2 | * | 3/2004 | Chang .................... 310/156.08 |
| 2002/0162939 A1 | | 11/2002 | Heidrich |
| 2002/0180295 A1 | | 12/2002 | Kaneda et al. |

FOREIGN PATENT DOCUMENTS

| DE | 100 53 694 A1 | 5/2002 |
| EP | 0 793 870 B1 | 7/1998 |
| EP | 0 887 908 A1 | 12/1998 |

(Continued)

OTHER PUBLICATIONS

Patent Abstracts of Japan, vol. 8, No. 221 (E-271), Oct. 9, 1984 regarding Japanese reference 59 103553 published Jun. 15, 1984, one page.

(Continued)

*Primary Examiner*—Tran N Nguyen
(74) *Attorney, Agent, or Firm*—Brinks Hofer Gilson & Lione

(57) ABSTRACT

A synchronous motor having a rotor, a magnet positioned on the rotor and a clamping element that fixes the magnet on the rotor, wherein the clamping element includes a strip arranged between the magnet and the rotor.

16 Claims, 2 Drawing Sheets

FOREIGN PATENT DOCUMENTS

| | | |
|---|---|---|
| JP | 59-103553 A | 6/1984 |
| JP | 04-079741 A | 3/1992 |
| JP | 2002-191146 A | 7/2002 |
| JP | 2003-264948 A | 9/2003 |

OTHER PUBLICATIONS

Patent Abstracts of Japan, vol. 16, No. 300 (E-1227), Jul. 2, 1992 regarding Japanese reference 04 079741 published Mar. 13, 1992, one page.

* cited by examiner

SYNCHRONOUS MOTOR

Applicant claims, under 35 U.S.C. §§120 and 365, the benefit of priority of the filing date of May 3, 2005 of a Patent Cooperation Treaty patent application, copy attached, Serial Number PCT/EP2005/004767, filed on the aforementioned date, the entire contents of which are incorporated herein by reference, wherein Patent Cooperation Treaty patent application Serial Number PCT/EP2005/004767 was not published under PCT Article 21(2) in English.

Applicant claims, under 35 U.S.C. §119, the benefit of priority of the filing date of Jun. 2, 2004 of a German patent application, copy attached, Serial Number 10 2004 027 036.8, filed on the aforementioned date, the entire contents of which is incorporated herein by reference.

BACKGROUND OF THE INVENTION

1. Field of the Invention

The present invention relates to a synchronous motor that employs magnets.

2. Description of the Related Art

Synchronous motors in the form of linear or rotary direct drive mechanisms play an increasingly important role in technology. Such direct drive mechanisms do not require any mechanical transmissions, they themselves move the useful load.

An example of such a direct drive mechanism is described in EP 0 793 870 B1. A stator supports teeth wound with coils, a rotor supports evenly arranged permanent magnets. These magnets are customarily glued onto a magnetic flux conductor. For certain applications, for example in connection with a turntable of a machine tool, very high numbers of revolutions are demanded of such a direct drive. Because of centrifugal forces, it is possible that the adherence of such a magnet to its substrate becomes detached at high numbers of revolutions. Waste heat occurring at high numbers of revolutions heats the motor excessively and in this way further contributes to the fact that it is no longer sufficient to glue the magnets on when encountering high numbers of revolutions.

Eddy currents are also responsible for heating the motor. Therefore the coils of the stator are wound on a laminated core, whose individual laminations are insulated against each other. The flux conductor of the rotor is occasionally designed in the form of a laminated core. For stopping eddy currents in the magnets themselves, JP04079741A has already proposed segmented magnets for motors, which are put together from several layers or segments which are insulated against each other. However, at high numbers of revolutions these steps alone do no result in a sufficiently stable connection between the magnet and rotor.

It has also already been proposed to clamp the magnets in addition to gluing. DE 100 53 694 A1 describes such a synchronous motor. Clamping of the magnets in place is achieved by clamping elements altached to the front of the rotor, which initially have individual clamping claws, and clamping the magnets in place on the rotor is achieved by bending the clamping claws in an axial orientation. However, additional components are required for this solution, moreover, the magnets are only clamped in place at the ends of the rotor.

SUMMARY AND OBJECTS OF THE INVENTION

It is therefore an object of the present invention to disclose a synchronous motor whose magnets are well protected against detachment from the rotor by clamping and which can be simply produced.

This object is attained by a synchronous motor having a rotor that includes: a body, a plurality of magnets positioned on the body of the rotor. For each of the plurality of magnets, a corresponding clamping element fixes a corresponding one of the plurality of magnets on the body of the rotor, wherein the corresponding clamping element includes a web arranged between the corresponding one of the plurality of magnets and the body of the rotor. The synchronous motor further including a stator including a coil that receives an electric current and generates a magnetic field that generates a torque on the rotor.

A synchronous motor with a rotor is proposed, on which magnets have been fixed by clamping elements, wherein the clamping elements are embodied in the form of webs which are arranged on the rotor between the magnets. Since the webs substantially extend over the entire axial length of the rotor, the magnets are well fastened to the rotor. This is of particularly great importance in case where magnets are employed which are segmented in the axial direction in order to reduce eddy current losses, and therefore heat generation in the magnets themselves.

Further advantages, as well as details of the present invention ensue from the following description of a preferred embodiment by the drawing figures. Shown here are in:

DESCRIPTION OF THE PREFERRED EMBODIMENT(S) OF THE INVENTION

Figure 1:
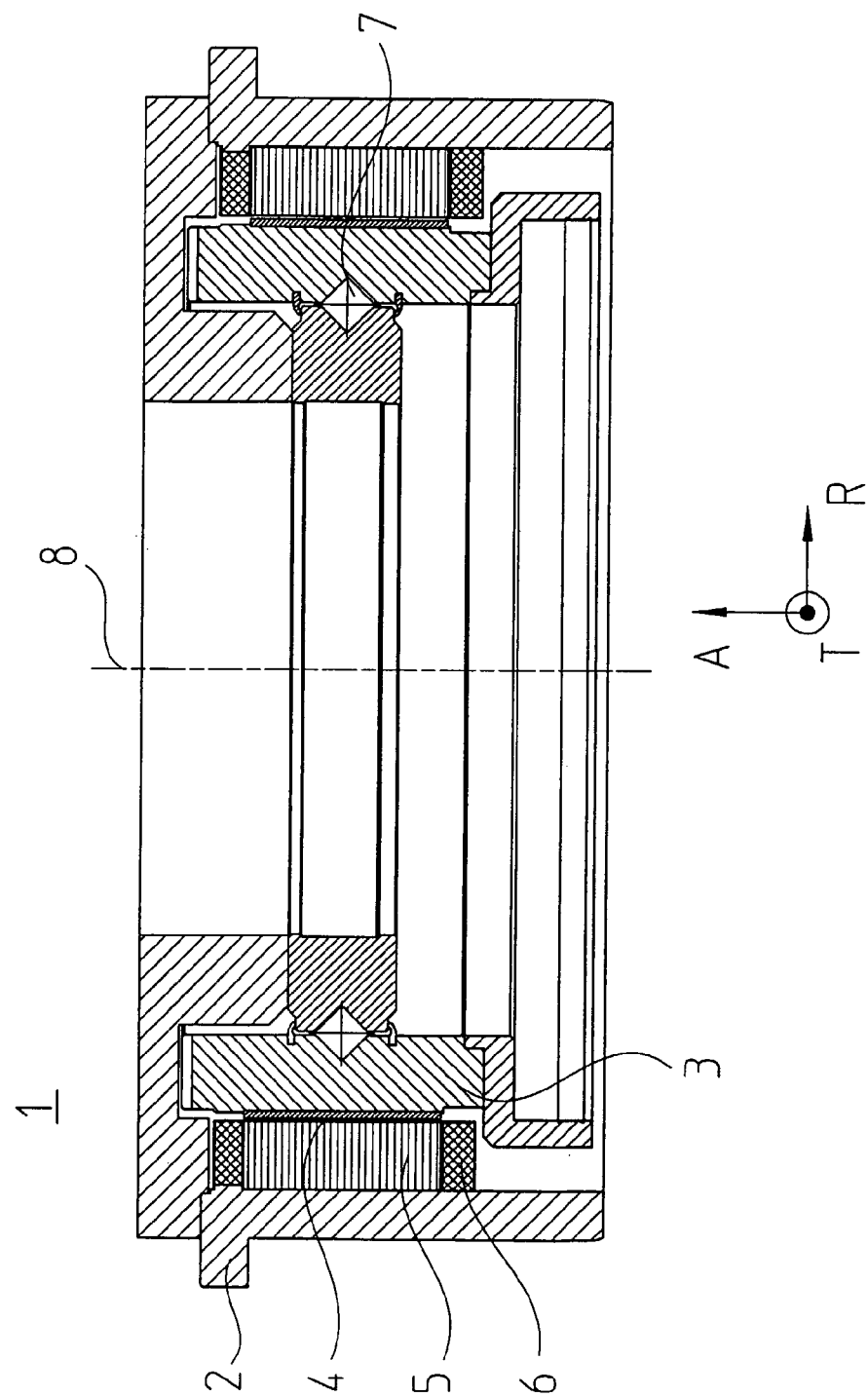
FIG. 1 shows an embodiment of a synchronous motor in accordance with the present invention.

A section through a rotary synchronous motor 1 is represented in FIG. 1. A stator 2, which is stationary in relation to the viewer, and a rotor 3, which is rotatably seated on a shaft 8 by a bearing 7, constitute components of this motor 1. An axial direction A, a radial direction R, and a tangential direction T (the latter perpendicularly to the drawing plane here) are predetermined by the geometry of the motor 1.

The stator 2 includes an iron core 5 with teeth and gaps. Coils or windings 6 have been inserted into the gaps of the iron core 5. Preferably the iron core 5 is embodied in the form of a laminated core, whose laminations are electrically insulated from each other for reducing eddy currents.

The rotor 3 includes magnets 4 arranged on the body of the rotor opposite the windings 6. Preferably the magnets 4 are neodymium-iron-boron magnets, which are segmented in the axial direction A in order to stop eddy currents in the magnets 4. The individual partial magnets, typically approximately 10 mm long in the axial direction, are here electrically insulated against each other.

Magnetic fields can be generated by the suitable application of electrical current to the windings 6 which, bundled in the iron core 5, act together with the magnetic fields of the magnets 4 in such a way that a torque is generated between the stator 2 and the rotor 3. Multitudinous methods are known for supplying the windings 6 with electrical current. For example, the windings 6 are interconnected in such a way that three different electrical phases are generated, which are controlled by pulse width-modulated currents.

If particularly high numbers of revolutions of the rotor 3 are required it is necessary to provide good fastening of the magnets 4 on the rotor 3. Not only do the centrifugal forces acting in the special exemplary embodiment play a role, but also the heating of the rotor by eddy currents, and possible tangential accelerations of the magnets 4 during acceleration and braking of the rotor 3.

The customary gluing of the magnets with the rotor therefore is possibly no longer sufficient, and is replaced or complemented by the present invention by a clamped connection.

Figure 2:
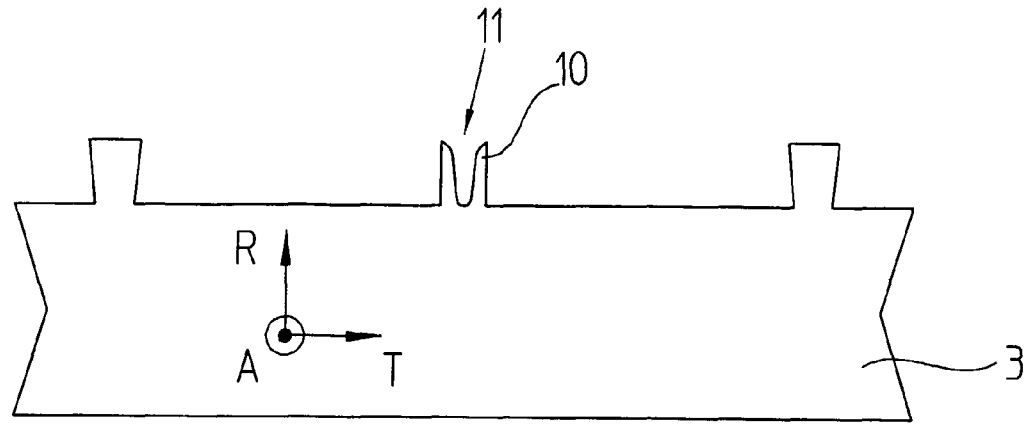
FIG. 2 shows a portion of an embodiment of a rotor without magnets used with the synchronous motor of FIG. 1 in accordance with the present invention.

Special devices at the rotor 3 are being employed for this. FIG. 2 shows a section of such a rotor 3 in an axial viewing direction, which has been drawn extended for the sake of simplicity. The axial, radial and tangential directions A, R and T have also been indicated in FIG. 2 in order to make orientation easier. A production stage of the rotor 3 is represented in FIG. 2, in which no magnets 4 have yet been fastened on the rotor 3.

A web 10 can be seen, which substantially extends over the axial length of the rotor 3. The web 10 has a groove 11 approximately centered and on the side facing away from the rotor 3. This groove 11 makes it possible to widen the web 10 on its side facing away from the rotor 3 and in this way to bend the lateral faces or walls of the web 10, which initially extended approximately perpendicularly on the rotor surface, into a tangential direction T. In this way the web 10 can be used for clamping magnets 4, and is therefore also called a clamping element 10.

Furthermore, the rotor 3 has detents 13 extending parallel with respect to the clamping elements 10, which have a trapezoidal-like cross section, so that the detents 13 are narrower on the side facing the rotor 3 than on the side facing away from the rotor 3.

Preferably several detents 13 and clamping elements 10 are alternatingly arranged on the body of the rotor 3 in the tangential direction (T). However, it is also possible to exclusively utilize clamping elements 10, since they themselves are also effective as detents, which will be shown further down below.

The same as the stator 2, the rotor 3 is preferably embodied in the form of a laminated core. It is possible in this way to keep eddy current losses low. Moreover, the rotor 3 with its clamping elements 10 and detents 13 can be manufactured very simply in one piece. Only a different tool, which has a shape in accordance with FIG. 2, needs to be used when stamping the sheet metal for the rotor 3. Several sheet metal parts arranged one behind the other result in the rotor 3 with webs 10 and detents 13. Therefore the manufacturing of a rotor 3 in accordance with FIG. 2 is no more expensive than that of a rotor 3 without clamping elements 10.

Figure 3:
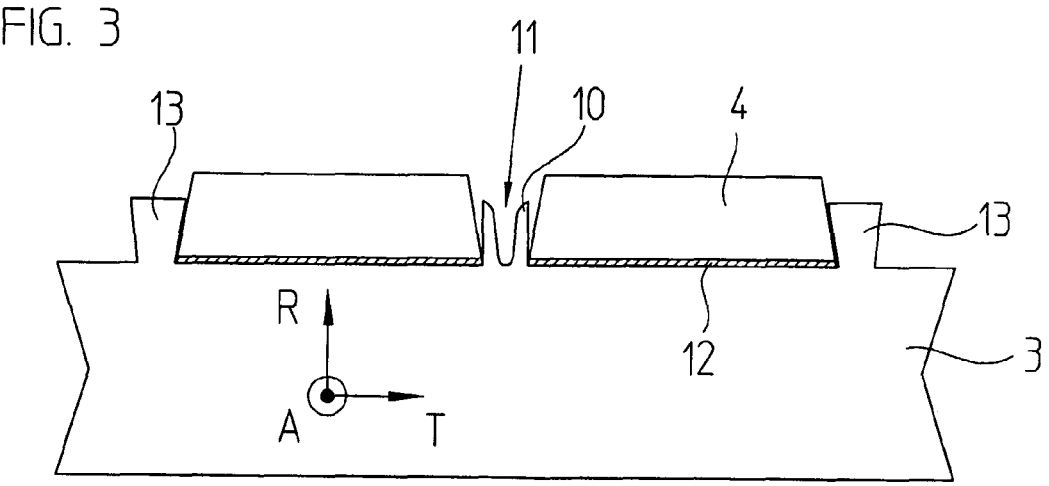
FIG. 3 shows a portion of the rotor of FIG. 2 with glued-on, not yet clamped magnets.

Magnets 4 have already been inserted now into the rotor 3 in FIG. 3 and are connected with it by means of an adhesive layer 12. The magnets 4 have a trapezoidal-like cross section, wherein the magnets 4 are wider on the side facing the rotor 3 than on the side facing away from the rotor 3. In this case the inclined lateral faces of the detents 13 and the magnets 4 are matched to each other. Because of the still almost perpendicular lateral faces of the clamping elements 10 at this stage of the manufacturing process, the insertion of the magnets 4 between the detents 13 and the clamping elements 10 is effortless.

Figure 4:
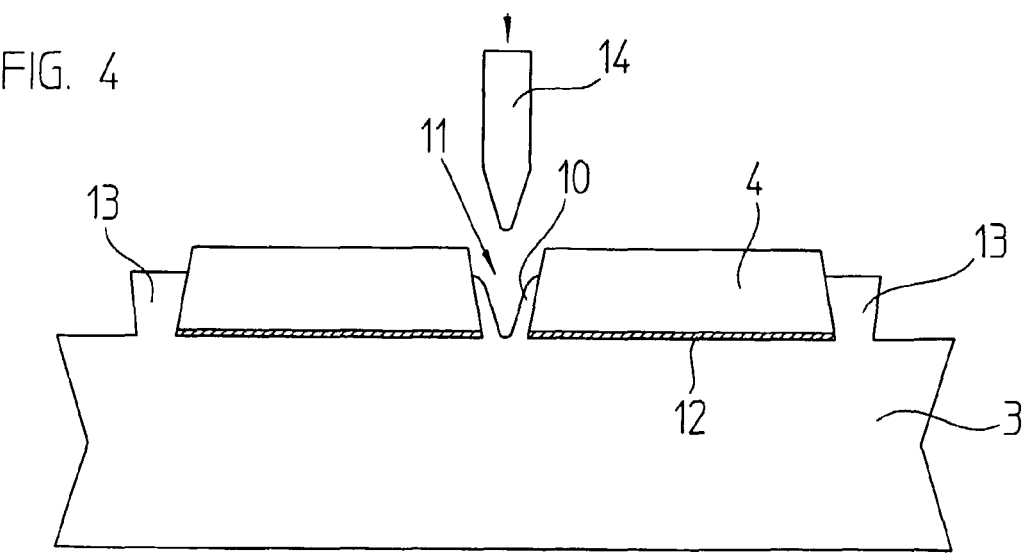
FIG. 4 shows a portion of the rotor of FIG. 3 with finished mounting of the magnets.

FIG. 4 shows the finished mounted rotor 3. The clamping effect of the clamping element 10 is activated by a punch 14 for expanding the clamping element 10. By pressing the punch 14 into the groove 11, the strip 10 is expanded on its side facing away from the rotor, its lateral faces or walls incline in the tangential direction until they come into contact with the inclined lateral faces of the magnets 4 and in this way press the magnets against the rotor 3 and against the detents 13. Such expansion of clamping element or web 10 is performed independent of the magnets 4 and results in the width of the groove increasing and the lateral faces or walls moving apart from each other. After expanding, their shape substantially corresponds to the shape of the detents 13, except for the groove 11. It is clear from this that it is possible to use strips 10 in place of the detents 13, which in this case would be arranged on both sides of each magnet 4, for example.

It is possible to activate all clamping elements 10 simultaneously by several punches 14, or one after the other with only a single punch 14.

The activation of the clamping effect of the clamping elements 10 preferably takes place prior to the adhesive layer 12 having set. The adhesive layer 12 protects the edges of the magnets 4, because it prevents them from being directly pressed against the detent 13 or the clamping element 10. All edges are preferably provided with a radius of 0.2 mm. Without an adhesive layer 12, all edges of the magnets 4 should be absolutely beveled or rounded.

In order to achieve clamping also in the radial direction A, on their inclined lateral faces the magnets 4 can be provided with an additional recess, which extends over only a portion of the axial length of the magnets 4. Then the clamping elements 10 engage this recess and secure the magnets against axial slippage. It is then possible to easily omit the adhesive layer 12.

It is not absolutely required to deform the webs 10 with the punch 14 over their entire length. A sectional expansion of the webs 10 is also sufficient. In this way the force necessary for an individual punching process is considerably reduced. Preferably, deformed and not deformed areas of the webs 10 of a length of approximately 5 mm alternate in the axial direction. This has been shown to be advantageous in connection with magnet segments of 10 mm length. The non-deformed areas of such a web 10 are superfluous and can be omitted, for example by the sectional use of different sheet metals for the laminated core of the rotor 3. In this case the web 10 is constituted by several spaced-apart web segments over the axial length of the rotor (in the example approximately 100 mm with a rotor diameter of 760 mm).

In general, approximately half the length of a magnet segment should be clamped by the clamping elements 10. The clamping force of each clamping element 10 should be distributed approximately evenly over the entire axial length of the rotor 3, or of the respectively clamped magnets 4.

Because the clamping elements 10 are thinner in the radial direction R than the magnets 4, they do not project into the gap between the rotor 3 and the stator 2. Therefore the gap can be kept optimally narrow in order to obtain maximum torque. This advantageous arrangement is made possible by the dovetail-like connection between the inclined lateral faces of the magnets 4 on the one hand, and on the other of the clamping elements 10, or detents 13.

The exemplary embodiment represented here represents a rotary synchronous motor. However, the present invention can also be utilized in connection with linear motors, which can also be considered as a segment of a rotary motor of an infinite radius. Then, the tangential direction of the rotor corresponds to the (linear) direction of movement of the linear motor, the axial direction extends perpendicularly with respect to it and, together with it, defines the plane of the magnets, the radial direction extends perpendicular in regard to the plane of the magnets. The movement between the rotor and the stator should be viewed as a relative movement. It is not important for the present invention which one of the two elements is being moved in relation to the surroundings and which one is at rest. Only that portion of the motor which supports the magnets is called a rotor, the stator supports the windings. It is of course possible to employ the present invention for every type of motor, or also generator, which employs magnets. In this sense the term synchronous motor should not be understood as a restriction to a special type.

The present invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A synchronous motor comprising:
    a rotor comprising:
        a body;
        a plurality of magnets positioned on said body of said rotor;
        for each of said plurality of magnets, a corresponding clamping element that fixes a corresponding one of said plurality of magnets on said body of said rotor, wherein said corresponding clamping element comprises a web on said body of said rotor and arranged between said corresponding one of said plurality of magnets and another one of said plurality of magnets, wherein for each of said plurality of magnets, said body of said rotor comprises a corresponding detent and said clamping element presses said corresponding magnet in a tangential direction against said corresponding detent, and wherein each of said plurality of magnets is pressed in a radial direction against said rotor by said corresponding clamping element; and
    a stator comprising a coil that receives an electric current and generates a magnetic field that generates a torque on said rotor.

2. The synchronous motor in accordance with claim 1, wherein a groove is formed in said web so as to allow expansion of said web on a side of said web facing away from said body of said rotor.

3. The synchronous motor in accordance with claim 1, wherein each of said plurality of magnets has a trapezoidal cross section, wherein each of said plurality of magnets becomes wider in a radial direction approaching said body of said rotor.

4. The synchronous motor in accordance with claim 1, wherein for each of said plurality of magnets, corresponding detents are arranged parallel with respect to said corresponding clamping element.

5. The synchronous motor in accordance with claim 4, wherein each of said corresponding detents has a trapezoidal cross section, so that each of said corresponding detents is narrower on a side of said corresponding detent facing said body of said rotor than on a side of said corresponding detent facing away from said body of said rotor.

6. The synchronous motor in accordance with claim 1, wherein for each of said plurality of magnets, said body of said rotor, said corresponding clamping element and said corresponding detent are embodied in one piece.

7. The synchronous motor in accordance with claim 1, wherein said body of said rotor is embodied in the form of a laminated core.

8. The synchronous motor in accordance with claim 1, wherein each of said plurality of magnets is glued together with said body of said rotor by a corresponding adhesive layer.

9. The synchronous motor in accordance with claim 1, wherein each of said plurality of magnets is segmented in an axial direction.

10. A method of manufacturing a synchronous motor comprising:
    providing a stator comprising a coil that receives an electric current and generates a magnetic field;
    providing a body of a rotor;
    positioning a plurality of magnets on said body of said rotor;
    fixing said plurality of magnets on said body of said rotor by arranging a plurality of webs on said body of said rotor and between said plurality of magnets, wherein said plurality of webs clamp said plurality of magnets to said body of said rotor;
    forming a groove in each of said plurality of webs so as to allow expansion of said plurality of webs on a side of each of said plurality of webs facing away from said body of said rotor;
    pressing each of said plurality of magnets in a tangential direction against a corresponding detent of said rotor by a corresponding one of said plurality of webs; and
    pressing each of said plurality of magnets in a radial direction against said body of said rotor by said corresponding one of said plurality of webs.

11. The method of claim 10, wherein said pressing each of said plurality of magnets in said tangential direction and said pressing each of said plurality of magnets in said radial direction is performed by a punch that is inserted into a plurality of grooves formed from said plurality of webs.

12. The method of claim 10, wherein said fixing comprises gluing said magnet together with said body of said rotor by an adhesive layer.

13. The method of claim 10, wherein at least one of said plurality of webs has a groove.

14. The method of claim 13, wherein during said fixing said plurality of magnets on said body of said rotor said groove is widened in size when compared to prior to said positioning said plurality of magnets on said body of said rotor, such widening of said groove is performed independent of said plurality of magnets.

15. The method of claim 10, wherein said web comprises:
    a first wall that engages one of said plurality of magnets during said fixing; and
    a second wall that engages a second one of said plurality of magnets during said fixing, wherein during said fixing said first wall and said second wall are moved away from each other independent of said plurality of magnets.

16. The method of claim 10, wherein each of said plurality of magnets becomes wider in a radial direction approaching said body of said rotor.

* * * * *